United States Patent Office 3,411,349
Patented Nov. 19, 1968

3,411,349
HIGH RESPONSE HYDRAULIC/PNEUMATIC LOAD CELL SYSTEM
Jody D. Smith, Chatsworth, and Robert Kuberek, Jr., Thousand Oaks, Calif., assignors to Hughes Aircraft Company, Culver City, Calif., a corporation of Delaware
Filed July 26, 1966, Ser. No. 568,006
10 Claims. (Cl. 73—141)

ABSTRACT OF THE DISCLOSURE

The system measures linearly applied unidirectional and bidirectional forces of varying frequency or, conversely, calibrates a pressure differential transducer through the use of forces having known values and has a capability of reading frequency rates up to 1,000 c.p.s. The primary element of the system is a closed loop high dynamic response load cell having a high speed and large flow closed loop hydraulic supply, including a large underlapped negative feedback circuit control assembly, and a closed loop negative pressure feedback circuit including opposed spool surfaces of equal area. Compartments adjacent these large spool areas have the smallest possible volume to obviate the effects of fluid compressibility. This smallest possible volume permits a very small fluid displacement in comparison to the large and high speed flow of fluid in the hydraulic supply so as to effectively eliminate the inertia of the mass of supply fluid. Therefore, the system has a very high hydraulic spring rate, a fast response to input force loads and a very low spool displacement under the loads to develop a restoring output force proportional to the force load input which is independent of supply pressure and the supply pressure variations.

---

The present invention relates to a system for sensing linearly applied unidirectional and bidirectional forces of varying frequency and, in particular, for measuring the forces or for calibrating a measuring device through the use of forces having a known value. The invention includes a novel closed loop high dynamic response load cell which is independent of finite supply pressures and of supply pressure variations.

The invention is particularly useful for measuring thrust and impulse forces and other high impulse force loads. Such forces result from many high energy devices as, for example, jet and rocket motors, projectiles, firearms and explosions. To implement the design of such devices and their associated equipment, it is highly desirable to measure both their transient and their steady state load levels through explosion or detonation profiles and thrust, impulse and impact studies. Prior measurement devices have been either nonexistent or, at least, deficient in several aspects, such as the ability to measure rapidly varying loads. In addition, in those devices which employ hydraulic or pneumatic mechanisms and pressure differential transducers, there has been no simple means of testing or calibrating the equipment, especially such transducers, particularly under alternating pressure conditions.

The present invention overcomes these and other problems by utilizing a load cell provided with a high speed and large flow closed loop hydraulic supply including a large underlapped negative feedback control assembly and a closed loop negative pressure feedback circuit including opposed spool surfaces of equal area. The feedback circuit is designed to permit a very small fluid displacement therein in comparison to the large flow of fluid in the hydraulic supply by means of the large underlapped control assembly to minimize and to effectively eliminate the inertia of the mass of supply fluid. The closed loop negative pressure feedback circuit provides for a very high hydraulic spring rate, a fast response to input force loads and a very low spool displacement under the loads to develop a restoring output force proportional to the force load input. The opposed spool surfaces of equal area allow the restoring output force and force load input to be independent of supply pressure and supply pressure variations. The output force is measured, in an illustrative embodiment, by a high response differential pressure transducer; however, if the force load input is known, the load cell may be utilized to test and to calibrate such a transducer.

It is, therefore, an object of the present invention to provide a system including a load cell for measuring the magnitude of unknown forces.

Another object is to provide such a system to calibrate a measuring device by sensing the magnitude of known forces.

A further object of the invention is the provision of a system including a load cell which is independent of supply pressure variations.

Another object of this invention is the provision of a load cell capable of handling various load requirements, whose frequency may vary.

A further object of the invention is to provide a load cell capable of measuring alternating force loads as well as unidirectional force loads.

Another object of the invention is the provision of a load cell having high dynamic response characteristics.

A further object of the invention is to provide a simple, yet accurate, load cell.

Another object of the invention is to provide a means for testing and calibrating pressure differential transducers under varying input load conditions.

Other aims and objects as well as a more complete understanding of the present invention will appear from the following explanation of an exemplary embodiment and the accompanying drawings thereof, in which:

FIG. 4 is an enlarged view of the load cell similar to FIG. 2 showing a portion of the load cell under test conditions.

Figure 1:
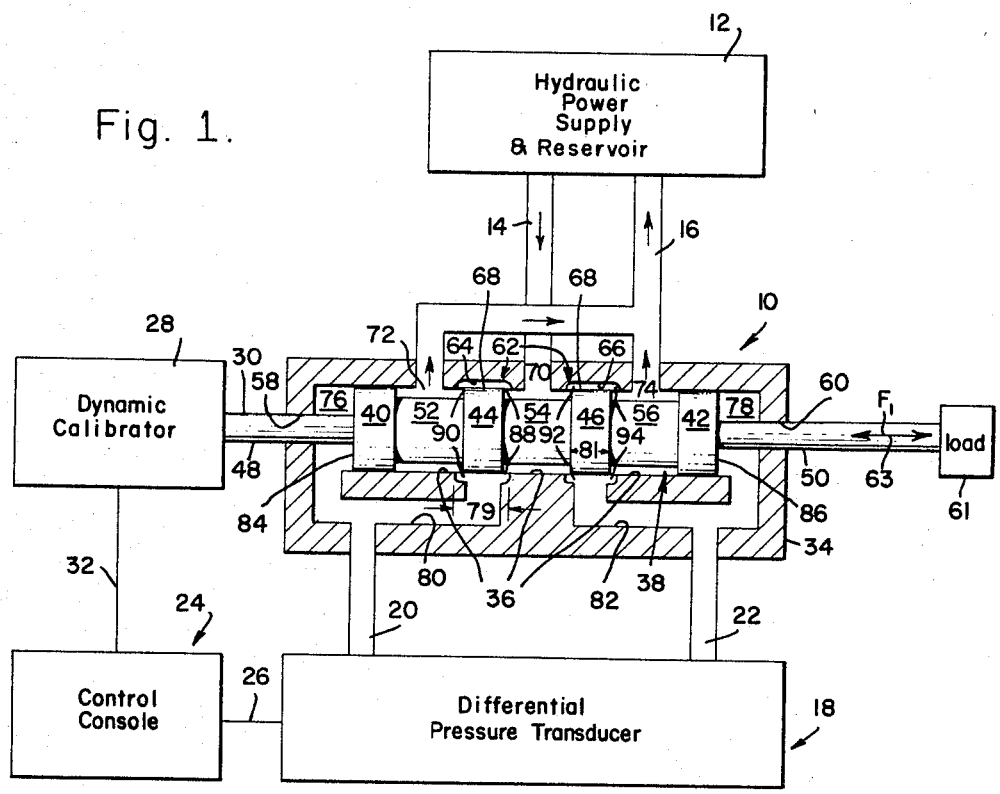
FIG. 1 is a block diagram of the invention, schematically illustrating the load cell.

Referring to FIG. 1, a hydraulic load cell 10 is supplied with a pressurized hydraulic fluid from a hydraulic power supply and reservoir 12 through a conduit. The fluid is returned from cell 10 to the power supply and reservoir by a forked conduit 16. Consequently, the combination of cell 10, power supply and reservoir 12, and conduits 14 and 16 comprise a first closed loop system. A conventional high response differential pressure transducer 18 is hydraulically connected to cell 10 by conduits 20 and 22 for sensing pressures within the load cell and for converting such pressures into electrical impulses. These impulses are fed into an electronic console instrumentation and control device 24 of conventional construction through an electrical connection 26 so that the information from cell 10 and transducer 18 may be observed and recorded. A dynamic calibrator 28 is secured to the load cell by a connection 30 to calibrate the load cell and to insure its proper operation. The dynamic calibrator is controlled and operated by the console instrumentation and control device through electrical leads 32.

Hydraulic load cell 10, as schematically depicted in FIG. 1, comprises a casing 34 having an internal chamber 36. A spool 38 is slidably disposed within the chamber and includes a sensing spool means comprising a pair of sensing spool elements 40 and 42, a control spool assembly comprising control spool elements 44 and 46, supporting shafts 48 and 50, and connecting shafts 52, 54 and 56. Supporting shafts 48 and 50 extend outside of chamber 36 through openings 58 and 60 in casing 34. Shaft 48 is secured to dynamic calibrator 28 by connection 30 while shaft 50 is connected to a load 61 to be measured or, conversely, to calibrate transducer 18 by a known force $F_1$ applied to shaft 50 in either or both directions indicated by arrows 63. Connecting shafts 52, 54 and 56 are of greater diameter than supporting shafts 48 and 50 and are of only slightly lesser diameter than spool elements 40, 42, 44 and 46 to provide maximum stability and rigidity of the spool. Shafts 48 and 50 are of relatively small diameter to provide large but equal areas on sensing spool elements 40 and 42 for a purpose to be described below.

Chamber 36 is partitioned into five annular compartments identified as fluid supply compartment 70, fluid return compartments 72 and 74, and pressure sensing compartments 76 and 78. Compartment 70 is formed by the facing surfaces of control spool elements 44 and 46, connecting shaft 54 and a portion of chamber 36. Fluid return compartments 72 and 74 are bounded by the facing surfaces of spool elements 40 and 44 and spool elements 42 and 46, respectively, portions of chamber 36, and the respective connecting shafts 52 and 56. Compartments 76 and 78 appear between spool elements 40 and 42 and the ends of chamber 36. Although FIG. 1 depicts compartments 76 and 78 as having large axial dimensions and volumes for illustrative purposes, in actual use the axial dimensions and volumes of the compartments are made as small as possible to obviate the effect of fluid compressibility and to insure the fastest possible response to input forces $F_1$.

A channel structure 62, comprising a pair of annular channels 64 and 66, are aligned about control spool elements 44 and 46, respectively. The width 79 of each channel is much greater than the width 81 of spool elements 44 and 46 so that the lands 68 thereof do not at any time completely cover either end and both ends of the channels. This "underlapped" arrangement forms an orifice structure comprising two pairs of annular servo ports 88, 90, 92 and 94, all of which are always open but which may vary in orifice dimension. During the cell's quiescent state, i.e., where no applied force $F_1$ is exerted upon shaft 50, ports 88 and 92 must be of the same dimension and ports 90 and 94 also must be of the same dimension; however, the two respective dimensions need not be equal. The term "underlap" refers to the fact that lands 68 are less wide than channels 64 and 66.

Hydraulic fluid from supply 12 is delivered at a large flow and a high speed through conduit 14 to fluid supply compartment 70, through the large passageways formed by lands 68 and channels 64 and 66 and into fluid return compartments 72 and 74 for return to power supply and reservoir 12 through conduit 16. Consequently, regardless of the positioning of all spools and the shafts, i.e., whether or not the load cell is in its quiescent state, fluid will continually flow in large quantities and at a high speed through a first closed loop defined by hydraulic power supply and reservoir 12, conduit 14, compartment 70, channels 64 and 66, compartments 72 and 74, and conduit 16.

The load cell is further provided with a second closed loop including a negative pressure feedback circuit comprising pressure compartments 76 and 78 which communicate respectively with channels 64 and 66 through conduits 80 and 82. Fluid pressures in compartments 76 and 78 are exerted, respectively, against a pair of opposed spool element surfaces 84 and 86, respectively formed on sensing spool elements 40 and 42. Surfaces 84 and 86 have large but equal areas so that small pressures will exert relatively large forces against the surfaces. The areas are made equal to obviate the effects of supply fluid pressure variations and fluctuations of pump speed (commonly called power supply noise).

In the quiescent state of the load cell, fluid rapidly passes from supply compartment 70 in equal and large quantities to return compartments 72 and 74 since control spool elements 44 and 46 are positioned centrally of channels 64 and 66. Therefore, annular servoport 88 is of the same dimension as annular servoport 92 and annular servoport 90 is of the same dimension as annular servoport 94 resulting in equal pressures within channels 64 and 66 and, consequently, pressure compartments 76 and 78. The equal pressures are sensed by differential pressure transducer 18 through conduits 20 and 22 and the pressure information is relayed to console instrumentation and control device 24.

When a unidirectional force is applied to shaft 50, the spools are displaced in the direction of the applied force $F_1$ (in the direction of one of the arrows) and, should this force be applied toward the load cell (i.e., towards the left side of FIG. 1), servoport 88 becomes larger than servoport 92 and servoport 94 becomes larger than servoport 90. Although hydraulic fluid will still flow with great velocity in large quantities from supply compartment 70 into both return compartments 72 and 74, two different pressures result in channels 64 and 66 because of the unequal openings between the four servoports to create a pressure differential and a small fluid displacement in pressure compartments 76 and 78. Despite the existence of the pressure differential, the fluid displacement is made as small as possible with respect to the high speed supply loop flow by means of the large underlapped arrangement so that the total inertia of the mass of supply fluid is eliminated from affecting the pressures in compartments 76 and 78. The pressure in compartment 76 is greater than that of compartment 78 and the difference in these pressures produces a restoring force which is directed oppositely to the applied force. This situation may be expressed by the following equation:

$$F_1 = (A_{84})P_{84} - (A_{86})P_{86} = F_r$$

where $F_1$ is the applied force,
$F_r$ is the restoring force,
$A_{84}$ is the surface area of spool element surface 84,
$A_{86}$ is the surface area of spool element surface 86,
$P_{84}$ is the pressure in compartment 76, and
$P_{86}$ is the pressure in compartment 78.

Since, however, the spool surface areas of spool elements 40 and 42 are equal (to wit, $A_{84} = A_{86} = A$) and since the pressures in compartments 76 and 78 reflect a differential pressure, the above equation may be expressed as follows:

$$F_1 = F_r = A(P_{84} - P_{86}) = A \Delta P$$

In other words, the flow of the mass of hydraulic fluid (the mass flow) into compartment 76, through servoport 88, may be defined as equal to the leakage flow of the mass of hydraulic fluid (the mass flow leakage) through servoport 90 and the change of storage of the mass of hydraulic fluid (the mass storage) in compartment 76. Similarly, the mass flow into compartment 78, through servoport 92, may be defined as equal to the mass flow leakage through servoport 94 and the change in mass storage in compartment 78.

In addition, as pressure builds up in compartment 76, a pressure force unbalance results against surface 84 of sensing spool element 40 to compensate for applied force $F_1$. This feedback pressure into compartment 76 increases until the restoring force equals the applied force. The increase in feedback pressure and the resulting force unbalance on spool element 40 compensates for and integrates out the acceleration and velocity components of the spool as it moves under the influence of the applied force.

Although the operation of the load cell and the remaining system has been described with respect to a unidirectionally applied force, a similar discussion is appropriate when the applied force is bidirectional (i.e., in both directions as indicated by arrow 63) since the differential pressure transducer will sense the restoring forces in both directions and feed this information into console instrumentation and control device 24.

Figure 2:
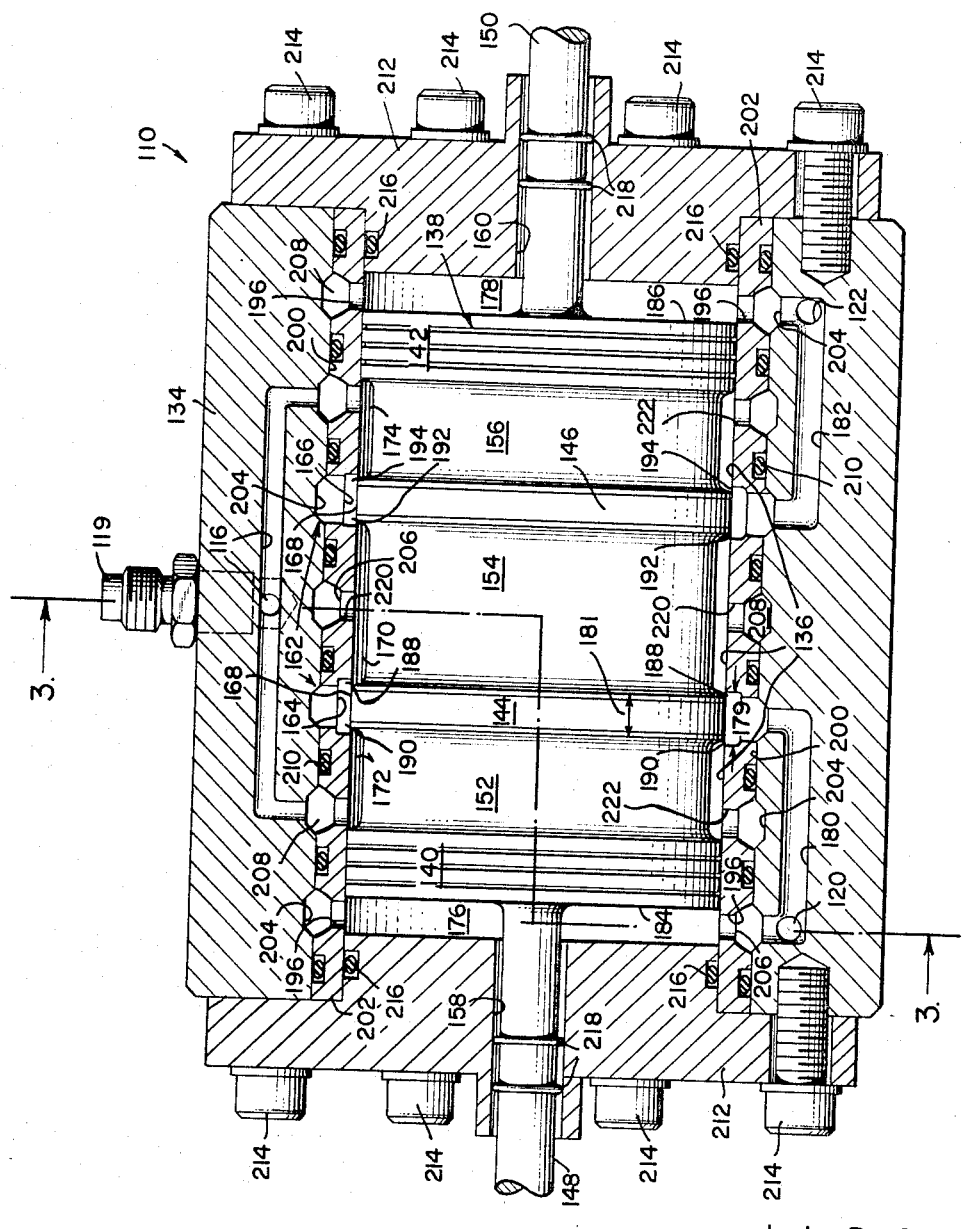
FIG. 2 is an elevational view of the load cell shown partly in section during its quiescent state, taken along lines 2—2 of FIG. 3.
Figure 3:
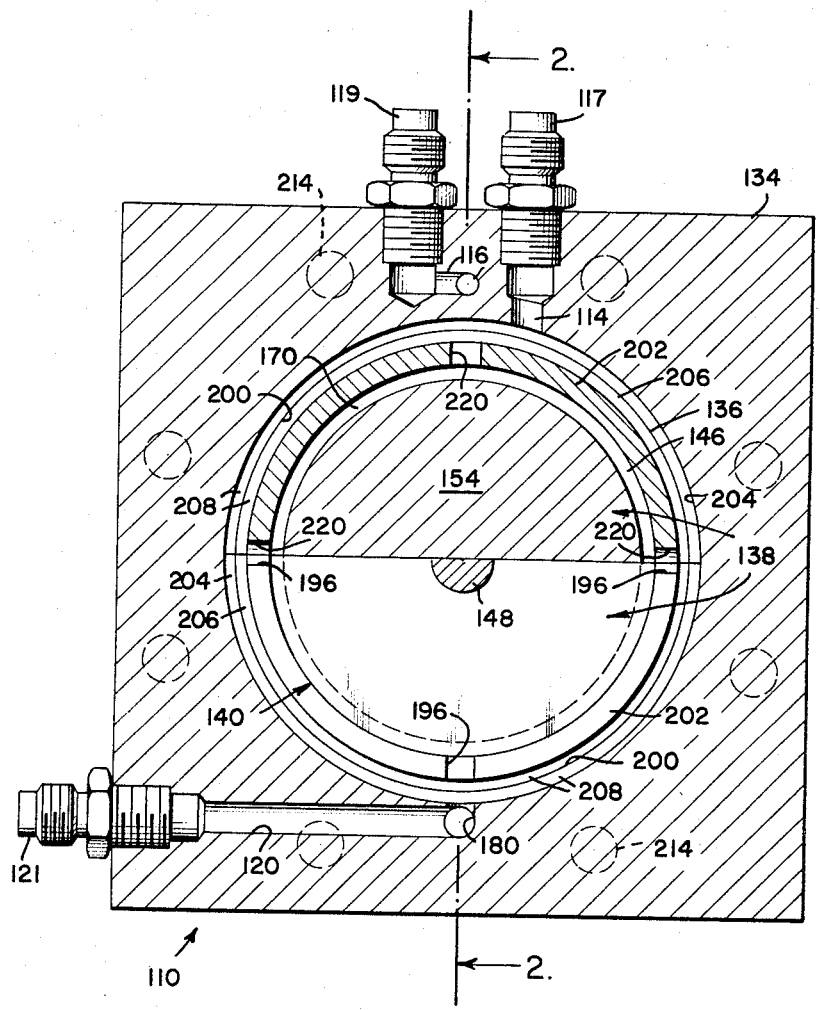
FIG. 3 is a cross-sectional view of the cell taken along lines 3—3 of FIG. 2.

Referring now to FIGS. 2 and 3, there is shown an illustrative embodiment of one form of the invention. A hydraulic load cell 110 includes a casing 134 into which a hydraulic fluid supply conduit 114 (see FIG. 3) and a branched hydraulic fluid return conduit 116 are bored. Conduit 114 is secured to a hydraulic supply by a fitting 117 while conduit 116 is connected to the reservoir by a fitting 119.

A bore 200 is provided in the casing and a cylinder 202 is disposed therein. A series of annular grooves 204 are formed in bore 200 which mate with similar annular grooves 206 on the exterior surface of cylinder 202 to provide a series of annular fluid passages 208.

Hydraulic fluid from supply conduit 114 rapidly flows in large quantities into one of annular fluid passages 208, through four circular bores 220, and into a fluid supply compartment 170. Hydraulic fluid exhausts rapidly from load cell 110 from fluid return compartments 172 and 174, through four circular bores 222, to fluid return conduit 116.

O-rings 210 are disposed between the cylinder and the casing to insure fluid tightness therebetween and between the annular fluid passages. Flanges 212 are secured at both ends to casing 134 by a series of threaded bolts 214 and O-rings 216 are placed between the flanges and cylinder 202 for sealing purposes. The flanges are provided with openings 158 and 160 for reception of supporting shafts 148 and 150 of a spool 138. O-rings 218 are placed between shafts 148 and 150 and their respective openings 158 and 160 to insure a fluid type seal between flanges 212 and spool 138.

The spool includes four spool elements identified as sensing spool elements 140 and 142 and control spool elements 144 and 146. Sensing spool elements 140 and 142 are defined as sensing spool means since they sense the restoring force when an applied force is directed onto supporting shaft 150. Control spool elements 144 and 146 are defined as a control spool assembly since they work in conjunction as a part of a hydraulic means which permit a differential pressure to be exerted against the sensing spool means. The sensing spool elements and control spool elements are rigidly secured together by relatively large diameter connecting shafts 152, 154 and 156. The connecting shafts are of greater diameter than supporting shafts 148 and 150 so that relatively large spool element surfaces 184 and 186 will appear on sensing spool elements 140 and 142 and so that spool elements 140, 142, 144 and 146 will not flex under pressure.

A channel structure 162 is formed on the interior surface of cylinder 202 and comprises two annular fluid passages including a pair of slotted channels 164 and 166 which are respectively aligned in a peripheral manner about control spool elements 144 and 146. Lands 168 are provided on the periphery of both control elements, each having a width 181 which is much less than the width 179 of its respective channel. Consequently, two sets of an annular servoport arrangement are obtained by the cooperation of lands 168 and channels 164 and 166. The annular servoport arrangement or orifice means comprises annular servoports 188, 190, 192 and 194, all of which are always open although their respective opening sizes may vary.

A negative pressure feedback conduit 180 leads from servoports 188 and 190, through four circular bores 196 to a pressure compartment 176 for supply of pressure against spool surface 184. A similar negative pressure feedback conduit 182 leads from servoports 192 and 194, through four circular bores 196, to a pressure compartment 178 of which spool surface 186 forms a part. Both compartments are shown to be large although their actual volumes are made as small as possible to ensure a high response to applied force loads. Conduits 120 and 122 lead from pressure compartments 176 and 178, respectively, for communication of pressures therefrom to a transducer such as differential pressure transducer 18 through a fitting 121 connected to conduit 120 and a similar fitting (not shown) connected to conduit 122.

The operation of the load cell depicted in FIG. 2 is the same as described above with respect to the device illustrated in FIG. 1. As shown in FIG. 2, the load cell is positioned in its quiescent state where no applied force has been directed against shaft 150 and, consequently, the pressures acting against surfaces 184 and 186 are equal. FIG. 4, on the other hand, shows the small displacement of spool elements 144 and 146 with their respective channels 164 and 166 which results from a force being applied to shaft 150, in this case, to the right of FIGS. 2 and 3, and which results in a fluid displacement and its consequential differential pressure in compartments 176 and 178 against surfaces 184 and 186.

Although the invention has been described with reference to a particular embodiment thereof, it should be realized that various changes and modifications may be made therein without departing from the spirit and scope of the invention.

What is claimed is:

1. A system for producing and sensing restoring forces in response to unidirectional and bidirectional external forces including a hydraulic load cell having a chamber and sensing spool means reciprocable in said chamber, said spool means having a pair of opposed spool surfaces, a shaft secured to said spool means and said surfaces and extending outside of said chamber for application of the external forces thereon, fluid flow means associated with said chamber and said surfaces and including a continuously open, closed loop, high speed and large flow fluid path for supply of a differential pressure against said surfaces in response to the application of the external forces to produce the restoring forces, and a mechanism secured to said fluid flow means for sensing the differential pressure and the restoring forces.

2. A system as in claim 1 wherein said fluid flow means includes orifice means, comprising a control spool assembly affixed to said shaft and a chamber channel structure cooperative with said spool assembly, and a hydraulic supply communicating with said orifice means.

3. A system as in claim 1 wherein said sensing spool means includes a pair of sensing spool elements each provided with said opposed spool surfaces to form a pair of pressure compartments within said chamber, said pressure compartments having a connection to said fluid flow means for communicating different hydraulic pressures to said pressure compartments when the external forces are applied to said shaft and for equalization of hydraulic pressures upon said spool surfaces when no external forces are applied to said shaft.

4. A system as in claim 1 wherein said opposed spool surfaces have equal areas.

5. A system for producing and sensing restoring forces in response to unidirectional and bidirectional external forces including a hydraulic load cell having a chamber and sensing spool means provided with a pair of opposed spool surfaces reciprocable in said chamber; a shaft secured to said spool means and said surfaces and extending outside of said chamber for application of the external forces thereon; hydraulic means associated with said chamber and said surfaces and provided with orifice means, said orifice means comprising a control spool assembly affixed to said shaft and a chamber channel structure cooperative with said spool assembly, said spool assembly and said channel structure being in a large underlapped arrangement, and a hydraulic supply communicating with said orifice means, for supply of a differential pressure against said surfaces in response to the application of the external forces to produce the restoring forces; and a mechanism secured to said hydraulic means for sensing the differential pressure and the restoring forces.

6. A system for producing and sensing restoring forces in response to unidirectional and bidirectional external forces including:
   a hydraulic load cell having:
      a chamber; and
      sensing spool means provided with a pair of opposed spool surfaces reciprocable in said chamber;
      a shaft secured to said spool means and said surfaces and extending outside of said chamber for application of the external forces thereon,
      hydraulic means associated with said chamber and said surfaces and provided with orifice means,
         said orifice means comprising a control spool assembly affixed to said shaft and a chamber channel structure cooperative with said spool assembly, and
            said spool assembly comprising a pair of spaced control spool elements having peripheral lands and
            said channel structure comprising a pair of channels respectively aligned peripherally with said spaced control spool elements and being wider than said lands to provide an underlapped arrangement therewith and to provide two pairs of servoports, and
      a hydraulic supply communicating with said orifice means and said channel structure for supply of a differential pressure against said surfaces in response to the application of the external forces to produce the restoring forces; and
      a mechanism connected to said opposed surfaces for sensing the differential pressure and the restoring forces.

7. A system as in claim 6 further including a pair of pressure compartments bounded respectively in part by said spool surfaces and conduits respectively secured between said channels and said pressure compartments, whereby movement of said spaced control spool elements under application of the external forces produces different orifice openings between each pair of said ports to effect the differential pressure.

8. A system as in claim 7 wherein said sensing spool means further includes a pair of sensing spool elements affixed to said shaft and provided respectively with said surfaces, each of said pair of sensing spool elements being spaced from said spool assembly to form fluid return compartments for return of the fluid to said hydraulic supply.

9. A system for producing and sensing restoring forces in response to unidirectional and bidirectional external forces including:
   a hydraulic load cell having:
      a chamber; and
      sensing spool means provided with a pair of opposed spool surfaces reciprocable in said chamber,
         said sensing spool means including a pair of sensing spool elements each provided with said opposed spool surfaces to form a pair of pressure receiving compartments within said chamber,
      a shaft secured to said spool means and said surfaces and extending outside of said chamber for application of the external forces thereon,
      hydraulic means including:
         a pair of spaced control spool elements affixed to said shaft and disposed within said chamber to form a pressure supply compartment, and
         a pair of spaced channels formed in said chamber and aligned respectively with said control spool elements to form fluid displacement servoports, each of said channels having a width greater than the width of each of said control spool elements, and
         said hydraulic means having a connection from said channels to said pressure receiving compartments and said surfaces for communicating different hydraulic pressures to said pressure receiving compartments and said surfaces and for producing the restoring forces when the external forces are applied to said shaft and for equalization of hydraulic pressures upon said spool surfaces when no external forces are applied to said shaft, and
      a mechanism secured to said pressure receiving compartments for sensing the differential pressure and the restoring forces.

10. A system for producing and sensing restoring forces in response to unidirectional and bidirectional external forces including a hydraulic load cell having a chamber and sensing spool means provided with a pair of opposed spool surfaces reciprocable in said chamber, a shaft secured to said spool means and said surfaces and extending outside of said chamber for application of the external forces thereon, hydraulic means provided with a closed loop hydraulic supply and return including orifice means having a large underlapped arrangement for rapid and continuous flow of hydraulic fluid in large quantities and provided with, in part, a closed loop negative pressure feedback circuit including conduit means connected between said orifice means and said surfaces for supply of a differential pressure against said surfaces in response to the application of the external forces to produce the restoring forces and for displacement in said negative pressure feedback circuit of hydraulic fluid in quantities relatively much smaller than the flow of fluid in said closed loop hydraulic supply and return, and a mechanism secured to said negative pressure feedback circuit for sensing the differential pressure and the restoring forces.

References Cited

UNITED STATES PATENTS

| 2,183,002 | 12/1939 | Bach | 73—515 |
| 2,939,470 | 6/1960 | Kohr | 73—515 XR |
| 3,062,046 | 11/1962 | Evans | 73—133 |
| 3,234,786 | 2/1966 | Christenson et al. | 73—141 XR |

RICHARD C. QUIESSER, *Primary Examiner.*

C. A. RUEHL, *Assistant Examiner.*